United States Patent [19]
Kave

[11] Patent Number: 5,120,103
[45] Date of Patent: Jun. 9, 1992

[54] SAFETY CHAIR APPARATUS

[76] Inventor: Gilda M. Kave, 2 Royal Crest, Los Alamos, N. Mex. 87544

[21] Appl. No.: 719,623

[22] Filed: Jun. 24, 1991

[51] Int. Cl.⁵ .............................. A61G 3/00; B60N 2/08
[52] U.S. Cl. .................................... 296/19; 296/65.1; 296/68.1; 297/344; 297/473; 248/429; 280/807
[58] Field of Search ................. 296/19, 20, 65.1, 68.1; 297/193, 473, 344; 248/429, 503.1, 501; 280/807

[56] References Cited

U.S. PATENT DOCUMENTS

| | | | |
|---|---|---|---|
| 2,149,946 | 3/1939 | Whedon et al. | 248/429 |
| 2,899,167 | 8/1959 | Elsner | 248/501 |
| 3,381,927 | 5/1968 | Stamates | 248/429 |
| 3,392,954 | 7/1968 | Malitte | 248/429 |
| 4,555,138 | 11/1985 | Hughes | 296/65.1 X |
| 4,645,160 | 2/1987 | Van Duser | 248/429 |

FOREIGN PATENT DOCUMENTS

| | | | |
|---|---|---|---|
| 2602875 | 7/1977 | Fed. Rep. of Germany | 280/807 |
| 2635735 | 3/1990 | France | 296/68.1 |
| 218030 | 7/1942 | Switzerland | 297/193 |
| 799311 | 8/1958 | United Kingdom | 297/193 |

*Primary Examiner*—Dennis H. Pedder
*Attorney, Agent, or Firm*—Leon Gilden

[57] ABSTRACT

A safety chair apparatus includes a seat and support back, with the seat and support back mounting a respective pair of securement straps securable to a central buckle member. The seat includes a plurality of pairs of downwardly extending legs, with each leg mounting a guide follower plate integrally to a lower terminal end thereof, with each follower plate mounted within a groove of an associated right and left track. The right and left track is mounted to a floor of an ambulance vehicle positioned between support tables on the floor for receiving gurneys and the like. A modification of the invention includes a compartmentalized seat for accommodating various medical components therewithin, and further the forward right and left legs each including a selectively applicable brake member to permit selective positioning of the seat between the support tables.

2 Claims, 5 Drawing Sheets

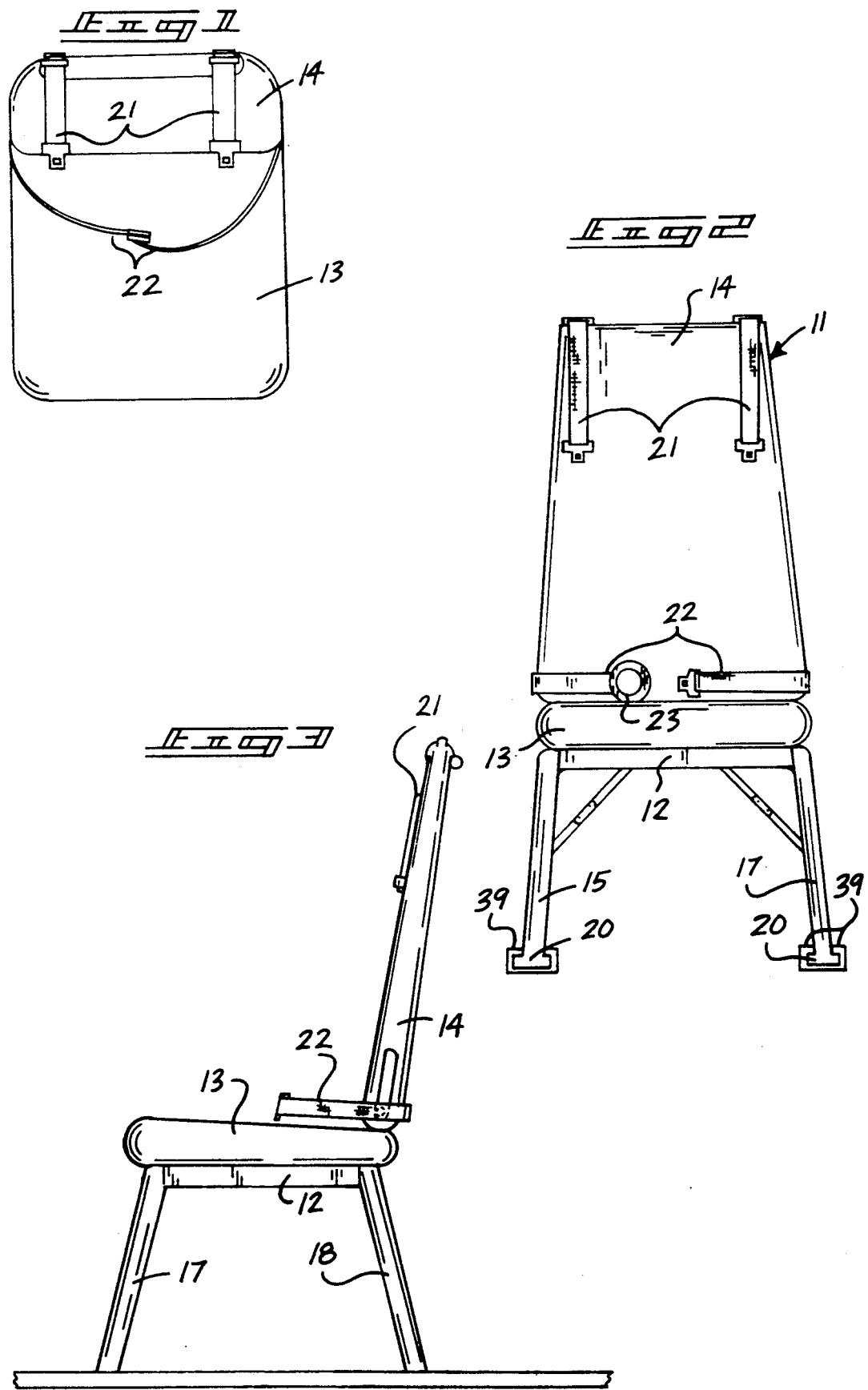

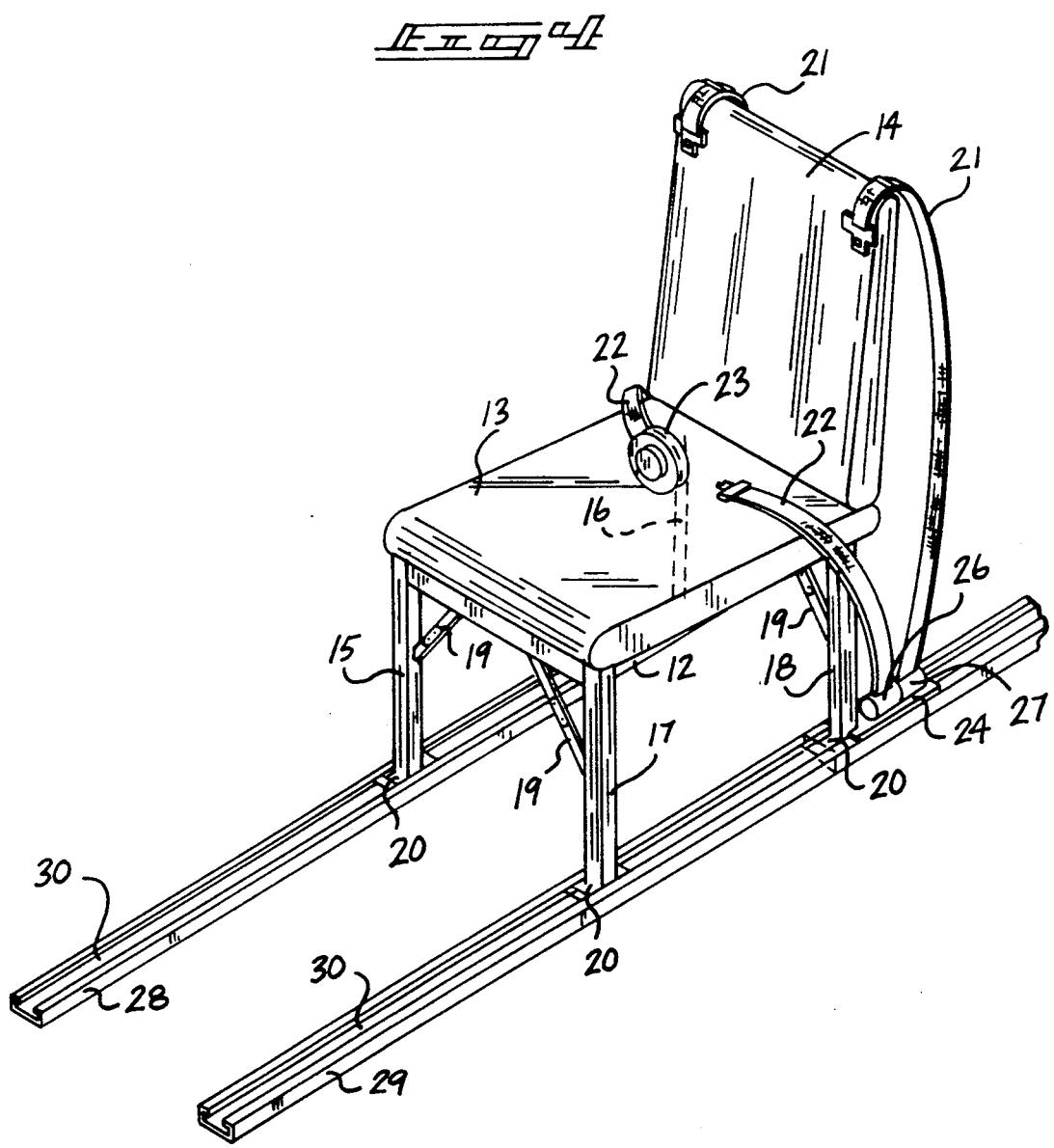

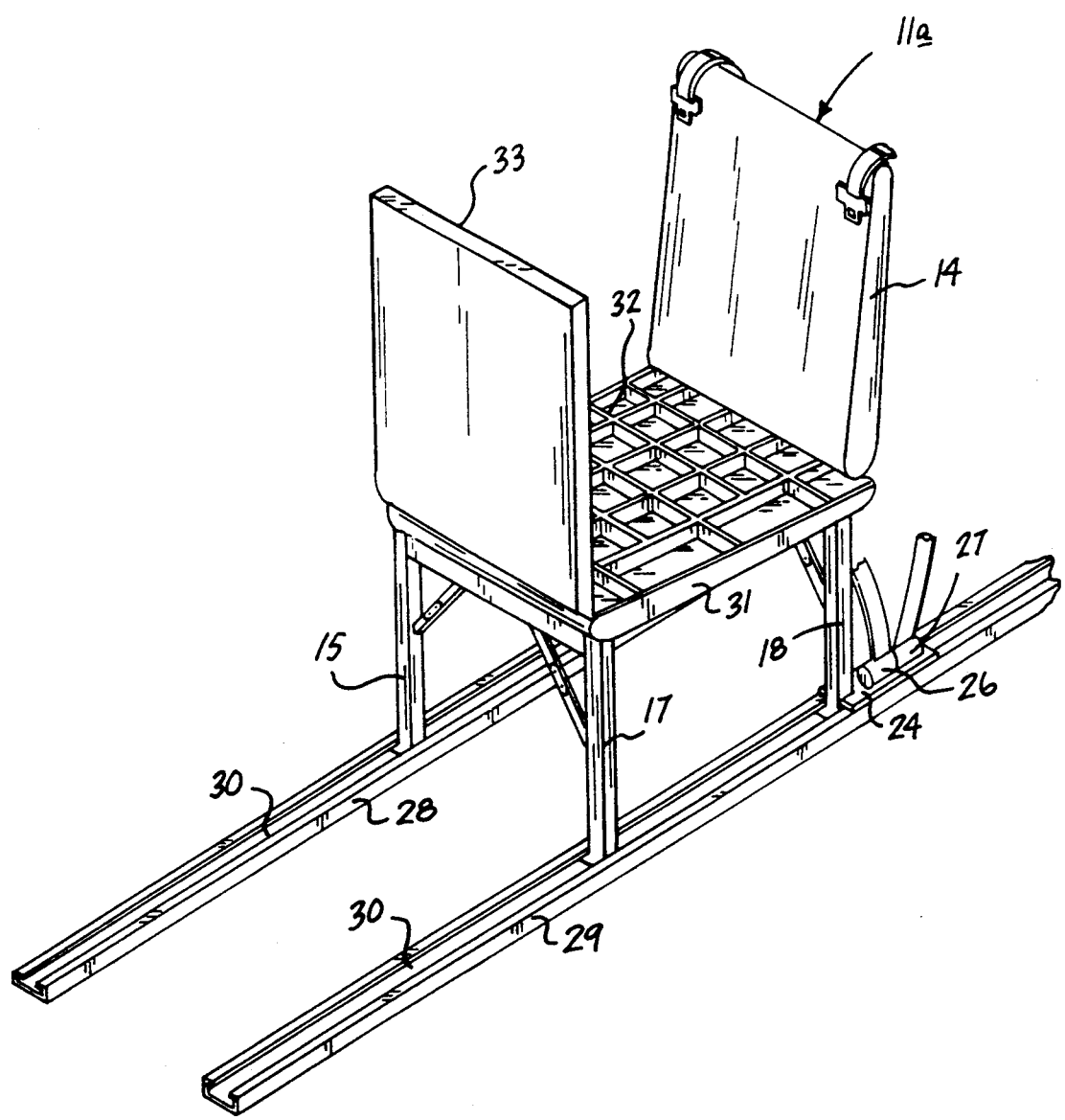

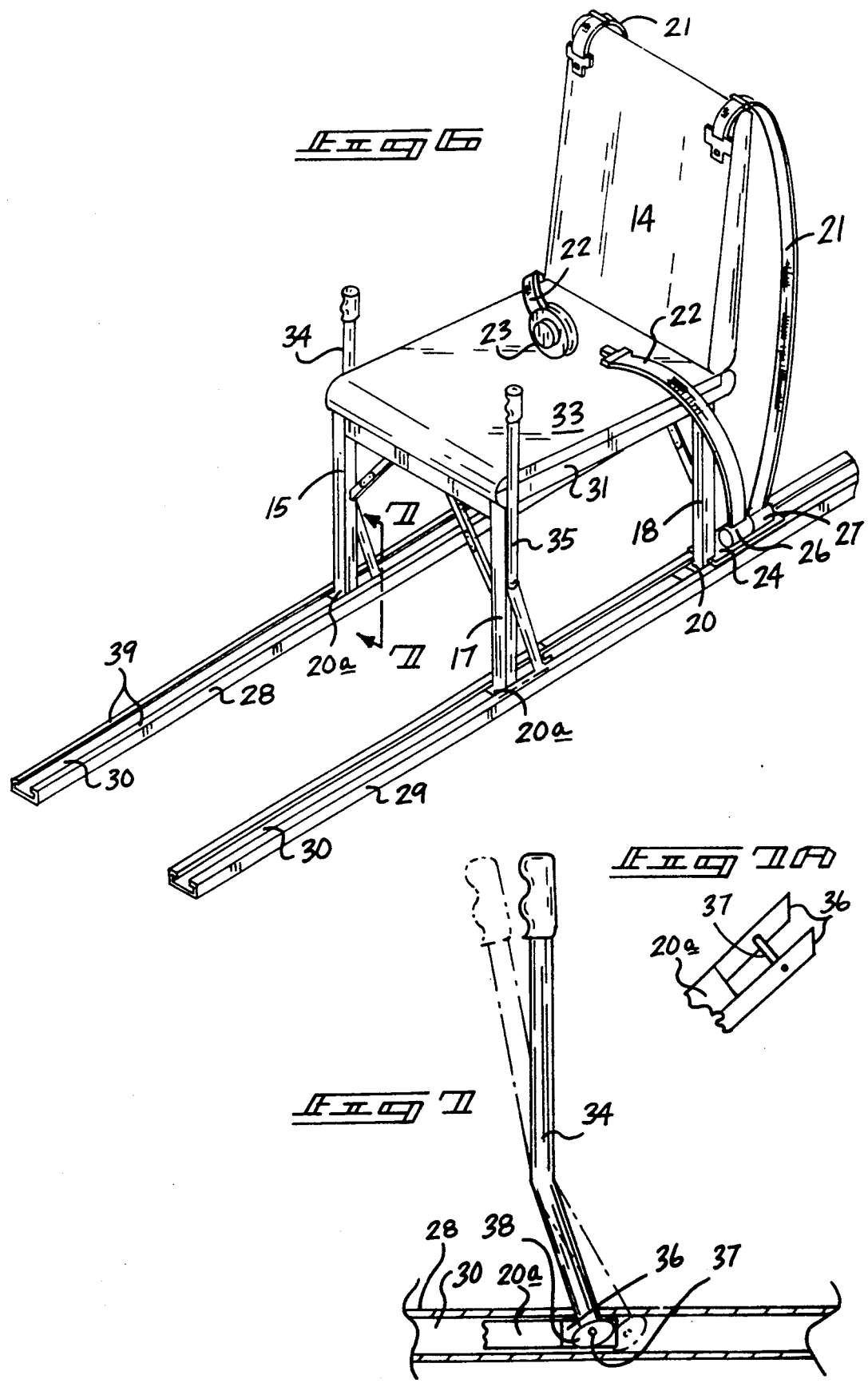

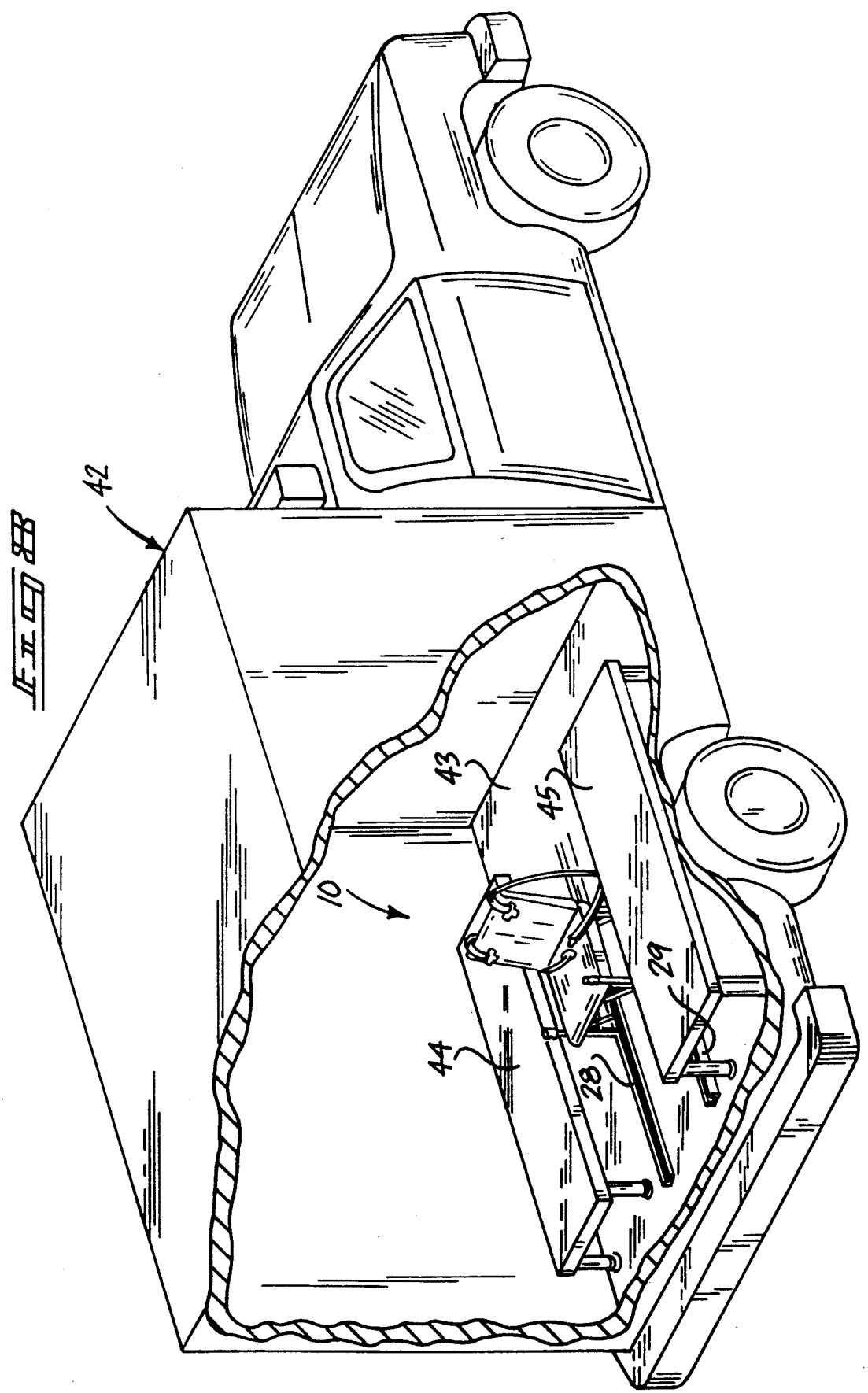

SAFETY CHAIR APPARATUS

BACKGROUND OF THE INVENTION

1. Field of the Invention

The field of invention relates to chair apparatus, and more particularly pertains to a new and improved chair apparatus wherein the same is slidably mounted between spaced support tables within an ambulance vehicle to provide ease of positioning of the chair between the legs for attending individuals on each support table in medical need.

2. Description of the Prior Art

Seat apparatus of various types is provided in the prior art to accommodate specialized situations. In ambulance vehicles, an attendant is required within the ambulance to attend a single or plurality of patients mounted upon spaced support tables. Positioning and accommodation of the patients is at times awkward due to the limited space therewithin. The instant organization permits an individual to be strapped within a safety chair apparatus, the safety chair apparatus positionable within parallel tracks permitting accommodation of the individuals. Prior art seat type structure for use in vehicles is exemplified in U.S. Pat. No. 4,588,228 to Nemoto wherein a vehicle seat includes removable arm portions.

U.S. Pat. No. 4,709,064 to Seura sets forth a vehicular rear seat arranged to permit reclining of the rear cushion relative to the seat portion.

U.S. Pat. No. 4,518,201 to Wahlmann, et al. sets forth a rear seat for use in a motor vehicle permitting pivotment of the rear seat relative to an underlying track structure.

U.S. Pat. No. 4,218,091 to Webster and U.S. Pat. No. 4,576,412 to Terada are further examples of seats for use in motor vehicles permitting angular positioning of the seat relative to a support base.

As such, it may be appreciated that there continues to be a need for a new and improved safety chair apparatus as set forth by the instant invention which addresses both the problems of ease of use as well as effectiveness in construction in accommodating an attendant in a secure and safe manner relative to spaced support tables within an ambulance vehicle and in this respect, the present invention substantially fulfills this need.

SUMMARY OF THE INVENTION

In view of the foregoing disadvantages inherent in the known types of chair apparatus now present in the prior art, the present invention provides a safety chair apparatus wherein the same is arranged to permit secure mounting of an individual within a chair apparatus for attending a plurality of patients within in an ambulance enclosure. As such, the general purpose of the present invention, which will be described subsequently in greater detail, is to provide a new and improved safety chair apparatus which has all the advantages of the prior art chair apparatus and none of the disadvantages.

To attain this, the present invention provides a safety chair apparatus including a seat and support back, with the seat and support back mounting a respective pair of securement straps securable to a central buckle member. The seat includes a plurality of pairs of downwardly extending legs, with each leg mounting a guide follower plate integrally to a lower terminal end thereof, with each follower plate mounted within a groove of an associated right and left track. The right and left track is mounted to a floor of an ambulance vehicle positioned between support tables on the floor for receiving gurneys and the like. A modification of the invention includes a compartmentalized seat for accommodating various medical components therewithin, and further the forward right and left legs each including a selectively applicable brake member to permit selective positioning of the seat between the support tables.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety chair apparatus which has all the advantages of the prior art chair apparatus and none of the disadvantages.

It is another object of the present invention to provide a new and improved safety chair apparatus which may be easily and efficiently manufactured and marketed.

It is a further object of the present invention to provide a new and improved safety chair apparatus which is of a durable and reliable construction.

An even further object of the present invention is to provide a new and improved safety chair apparatus which is susceptible of a low cost of manufacture with regard to both materials and labor, and which accordingly is then susceptible of low prices of sale to the consuming public, thereby making such safety chair apparatus economically available to the buying public.

Still yet another object of the present invention is to provide a new and improved safety chair apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the chair member utilized by the instant invention.

FIG. 2 is an orthographic frontal view, taken in elevation, of the chair member.

FIG. 3 is an orthographic side view of the chair member.

FIG. 4 is an isometric illustration of the chair member mounted within spaced parallel tracks.

FIG. 5 is an isometric illustration of a modified chair member utilized by the invention.

FIG. 6 is an isometric illustration of a further modified chair construction utilized by the instant invention.

FIG. 7 is an orthographic side view, partially in section, taken along the lines 7—7 of FIG. 6 in the direction indicated by the arrows.

FIG. 7a is a fragmentary isometric illustration of a modified follower plate utilized at lower terminal ends of the forward legs of the chair apparatus, as illustrated in FIG. 6.

FIG. 8 is an isometric illustration of the organization mounted within an ambulance vehicle.

DESCRIPTION OF THE PREFERRED EMBODIMENT

With reference now to the drawings, and in particular to FIGS. 1 to 8 thereof, a new and improved safety chair apparatus embodying the principles and concepts of the present invention and generally designated by the reference numeral 10 will be described.

More specifically, the safety chair apparatus 10 of the instant invention essentially comprises a chair member 11 that is formed by a perimeter seat frame 12 mounting a cushion member 13 thereon. The cushion member is defined as a seat cushion member and includes a seat back member 14 mounted at an oblique included angle between the seat cushion member 13 and the seat back member 14. The seat frame 12 includes integrally mounted front and rear leg pairs defined by a respective front and rear right leg 15 and 16 respectively and a front and rear left leg 17 and 18 respectively. The legs each include a pivotally mounted locking lever 19 to provide selective folding and locking of each leg against the seat frame 12 when the chair member 11 is removed from the associated right and left guide tracks 28 and 29. Each lower terminal end of each leg 15–19 includes a guide follower plate 20 integrally mounted to each lower terminal end of each leg. Each guide follower plate 20 is in turn mounted within a guide slot 30 of a respective guide track. Accordingly, the front and rear right legs 15 and 16 include their respective guide follower plates mounted within the right guide track, wherein the front and rear left legs 17 and 18 include their respective guide follower plates 20 mounted within the guide slot 30 of the left guide slot 29.

The seat back member 14 includes a plurality of shoulder strap members 21 that are extensibly mounted relative to the seat back member, wherein the seat cushion member 13 includes a plurality of lap strap members 22. A buckle member 23 receives the shoulder and lap strap members to permit an individual securement within the chair member 11.

In this manner, an individual mounted upon the chair member with the chair member and the associated right and left guide tracks 28 and 29 mounted between respective right and left support tables 44 and 45 fixedly mounted to the floor 43 of an ambulance vehicle 42 permits an individual to selectively reciprocate between the support tables on the guide tracks to accommodate attending ambulance transported victims mounted upon each respective support table.

FIG. 5 illustrates a modified chair member 11a, including a lower seat chamber 31 that is compartmented and fixedly mounted to the seat frame 12. The compartmented seat chamber 31 includes intersecting divider walls 32 to define compartments for receiving various medical components therewithin for use by an individual. A cushioned seat chamber lid 33 is pivotally mounted to a forward edge of the lower seat chamber 31. In this manner, access to required medical supplies are readily stored and replenished relative to the chair apparatus.

FIGS. 4 and 5 also illustrate the use of a support bracket 24 mounted at a lower terminal end of each rear right and left leg 16 and 18, wherein the support brackets 24 are fixedly mounted to those legs and slidably mounted to a top surface of the top flanges 39 (see FIG. 2 for example) of each of the right and left guide tracks 28 and 29. The support bracket 24 mounts respective first and second belt retraction canisters 26 and 27, wherein the belt retraction canisters are arranged for mounting the lap strap members 22 and the shoulder strap members 21 respectively within the canisters. The organization accordingly sets forth a compact structure permitting ease of removal of the strap members during periods of non-use from the seat cushion area permitting access to the compartmented lower seat chamber 31.

FIGS. 6 and 7 illustrate the use of right and left locking levers 34 and 35 associated with each respective right and left front leg 15 and 17. Each locking lever is mounted to a modified right follower plate 20a that includes rearwardly extending side plates 36 positioned within the guide slot 34 and adjacent the side walls of each respective guide track. The rearwardly extending side plates 36 fixedly mount a mounting axle 37 orthogonally therebetween (see FIG. 7a), with the mounting axle 37 mounting a cam member 38 that is fixedly mounted to a lower terminal end of each of the locking levers 34 and 35. Rotation of each locking lever and each associated cam member 38 rotates the cam member to a canted position below the top flanges 39 of each of the guide tracks to thereby engage the top flanges and the associated floor of each guide track to thereby frictionally engage the flanges and floor and arrest movement of the chair structure relative to the right and left guide tracks by use of the respective right and left locking levers 34 and 35.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety seat apparatus in combination with an ambulance vehicle, wherein the safety chair apparatus includes an ambulance vehicle floor, the floor including a right and left support table, the right and left support table including a spacing therebetween on the floor, and the floor including a respective right and left guide track, the right and left guide track slidably mounting a chair member relative to the right and left guide track, the chair member including a seat frame and a seat cushion member mounted upon the seat frame, and a seat back member mounted at an oblique included angle to a rear edge portion of the seat frame, and the seat frame further including a respective front and rear right leg slidably mounted within the right guide track, and a respective front and rear left leg slidably mounted within the left guide track, and each leg includes a guide follower plate fixedly mounted to a lower terminal end of each leg, and the right and left guide tracks include a respective right and left guide slot, and the guide follower plate of the front and rear right leg mounted within the right guide slot, and the guide follower plate of the front and rear left legs mounted within the left guide track, and the seat back member mounts a plurality of shoulder strap members retractably and extensibly mounted relative to the seat back member, and the seat cushion member includes a plurality of lap strap members retractably mounted relative to the seat cushion member, and the rear right leg and the rear left leg each include a support bracket, the support bracket fixedly mounted adjacent a lower terminal end of the respective rear right and left legs, and each support bracket mounting a respective first and second belt retraction canister, the first and second belt retraction canister of each support bracket retractably mounting a strap of the respective lap and shoulder strap members therewithin.

2. An apparatus as set forth in claim 1 wherein the seat cushion member includes a lower seat chamber fixedly mounted to the seat frame, the seat chamber including a compartmented cavity defined by intersecting divider walls, and a cushioned seat chamber lid pivotally mounted to a forward edge of the lower seat chamber permits selective access to the lower seat chamber upon rotation of the seat chamber lid relative to the lower seat chamber.

* * * * *